(12) United States Patent
Sabin et al.

(10) Patent No.: US 6,908,581 B2
(45) Date of Patent: Jun. 21, 2005

(54) OPTIMIZED FLOW TO PREVENT CORE LAYER BREAKTHROUGH

(75) Inventors: Douglas Sabin, Marblehead, MA (US); Paul Swenson, South Hamilton, MA (US)

(73) Assignee: Kortec, Inc., Beverly, MA (US)

( * ) Notice: Subject to any disclaimer, the term of this patent is extended or adjusted under 35 U.S.C. 154(b) by 89 days.

(21) Appl. No.: 10/355,642

(22) Filed: Jan. 31, 2003

(65) Prior Publication Data

US 2003/0160346 A1 Aug. 28, 2003

Related U.S. Application Data

(63) Continuation-in-part of application No. 09/828,254, filed on Apr. 6, 2001, now Pat. No. 6,596,213.
(60) Provisional application No. 60/353,596, filed on Jan. 31, 2002, now abandoned.

(51) Int. Cl.$^7$ ............................................. B29C 45/16
(52) U.S. Cl. ................. 264/255; 264/328.8; 264/328.12
(58) Field of Search ............................ 264/255, 328.1, 264/328.8, 328.12, 513, 537, 40.7, DIG. 57; 425/129.1, 130, 133.1, 573

(56) References Cited

U.S. PATENT DOCUMENTS

| | | | |
|---|---|---|---|
| 3,921,856 A | 11/1975 | Langecker | |
| 3,947,177 A | 3/1976 | Eckardt | |
| 4,017,240 A | 4/1977 | Nelson | 425/192 R |
| 4,174,413 A * | 11/1979 | Yasuike et al. | 428/35.7 |
| 4,526,821 A * | 7/1985 | McHenry et al. | 206/524.6 |
| 4,533,308 A | 8/1985 | Cloeren | 425/131.1 |
| 4,554,190 A | 11/1985 | McHenry et al. | 428/35 |
| 4,708,618 A | 11/1987 | Reifenhauser et al. | 425/133.5 |
| 4,751,035 A | 6/1988 | McHenry et al. | 264/255 |
| 5,028,226 A | 7/1991 | De'Ath et al. | |
| 5,238,715 A | 8/1993 | Wefers et al. | |
| 5,354,378 A | 10/1994 | Hauser et al. | 118/696 |
| 5,401,454 A | 3/1995 | Mendel | 264/176.1 |
| 5,516,273 A | 5/1996 | Delmore et al. | 425/192 R |
| 5,728,407 A | 3/1998 | Matsui | 425/7 |
| 5,750,159 A | 5/1998 | Delmore et al. | 425/190 |
| 5,763,033 A | 6/1998 | Tropsha et al. | |
| 5,914,138 A * | 6/1999 | Swenson | 425/130 |
| 6,063,325 A * | 5/2000 | Nahill et al. | 264/513 |
| 6,077,578 A | 6/2000 | Valyi | |
| 6,099,780 A * | 8/2000 | Gellert | 264/255 |
| 6,187,241 B1 * | 2/2001 | Swenson | 264/255 |
| 6,194,041 B1 | 2/2001 | McHenry et al. | 428/35.7 |
| 6,350,401 B1 * | 2/2002 | Gellert et al. | 264/255 |
| 6,440,350 B1 * | 8/2002 | Gellert et al. | 264/328.1 |
| 6,596,213 B2 * | 7/2003 | Swenson | 264/255 |
| 2003/0026933 A1 | 2/2003 | Kermet | |

OTHER PUBLICATIONS

International Search Report for corresponding International Appln. No. PCT/US03/02867.

* cited by examiner

*Primary Examiner*—Angela Ortiz
(74) *Attorney, Agent, or Firm*—Duane Morris LLP; Steven E. Koffs

(57) ABSTRACT

A method of co-extruding a plurality of plastic material flowing streams into a mold cavity produces a molded product. Inner and outer streams of covering plastic materials are combined with at least one interior stream that is to serve as an interior core of a resulting molded plastic product. The combined streams are forced to flow along annular flow paths, with the annular interior stream encased within the inner and outer annular covering plastic material stream layers. The flows of the interior stream and the inner and outer streams are controlled so that: the interior stream has a flow velocity that is greater than an average velocity of the combined stream, and the interior stream does not flow along or across a zero-velocity-gradient streamline of the combined streams.

12 Claims, 3 Drawing Sheets

OPTIMIZED FLOW TO PREVENT CORE LAYER BREAKTHROUGH

This application is a continuation-in-part of U.S. patent application Ser. No. 09/828,254, filed Apr. 6, 2001, now U.S. Pat. No. 6,596,213. This application claims the benefit of U.S. Provisional Patent Application No. 60/353,596, filed Jan. 31, 2002, now abandoned.

FIELD OF THE INVENTION

This invention relates to an injection molding process, and in particular, a method and apparatus for preventing an interior layer from breaking through a flow front made up of at least one inner and one outer layer in an injection molding process.

BACKGROUND

Many plastic articles are formed by injection molding processes. These articles include common items such as test tubes and pre-forms for forming items such as beer and ketchup bottles. Many of these articles are produced from injection molding machines having the ability to inject multiple plastic layers at the same time (i.e., co-injection). Thus, the injection-molded articles may have two or more layers of plastic in their final form (i.e., multi-layer plastic articles).

A common configuration of multi-layer plastic articles includes an interior or "core" plastic layer, which is surrounded on substantially all sides by an outer plastic layer. For example, see U.S. Pat. Nos. 5,914,138 and 6,187,241, both assigned to Kortec, Inc. The disclosures of both of these patents are incorporated herein by reference. Typically, the interior (core) layer is formed of a material such as Ethyl Vinyl Alcohol (EVOH), and the inner and outer layers are formed from a material such as Polyethylene Terephtholate (PET) or Polypropylene (PP). This construction produces a sandwich structure wherein the inner and outer layers (e.g., PET) form both the exterior and the interior surfaces of the article, and the interior (core) layer (e.g., EVOH) is sandwiched therebetween.

A common problem in multi-layer molding is maintaining a uniform penetration of the leading edge of the interior layer when the interior layer is not near the zero gradient of the velocity profile of the flowing polymer stream as it flows through the hot runner nozzle and/or in the mold cavity forming the molded article. This problem particularly occurs when there are reasons to form a multi-layer article wherein the interior layer is not centered on the mid-plane of the article. In two-material, three-layer molding, when molding a tube shaped article with one closed end containing the part gate, it may be desirable for the leading edge of the interior layer to be very close to the far end of the article. When the container closure is applied to the open end it is desirable to minimize the area of the container below the seal, which does not contain interior layer. This is particularly true if the interior layer is a high barrier material with permeation rates that are less than 10% of the skin. In this case any area of the container without interior layer barrier material, can become a significant leak and raise the total container permeability.

U.S. Pat. No. 4,751,035 describes a method in which the interior layer is folded over by the sequential injection of materials across the zero-velocity-gradient streamline. In fold over the core (interior) material will break through when it reaches the flow front. In this method, some portion of the interior is always on the zero-velocity-gradient streamline.

Thus, there is presently a need for a method and apparatus for injection molding articles where the breakthrough of the leading edge of the interior layer can be substantially prevented.

SUMMARY OF THE INVENTION

A method of co-extruding a plurality of plastic material flowing streams into a mold cavity to produce a molded product is provided. Inner and outer streams of covering plastic materials are combined with at least one interior stream that is to serve as an interior core layer of a resulting molded plastic product. The combined streams are forced to flow along annular flow paths, with the interior stream encased within the inner and outer annular covering plastic material stream layers. The flows of the interior stream and the inner and outer streams are controlled so that: the interior stream has a flow velocity that is greater than an average velocity of the combined streams, and the interior core stream does not flow along or across a zero-velocity-gradient streamline of the combined streams.

DETAILED DESCRIPTION

Figure 1:
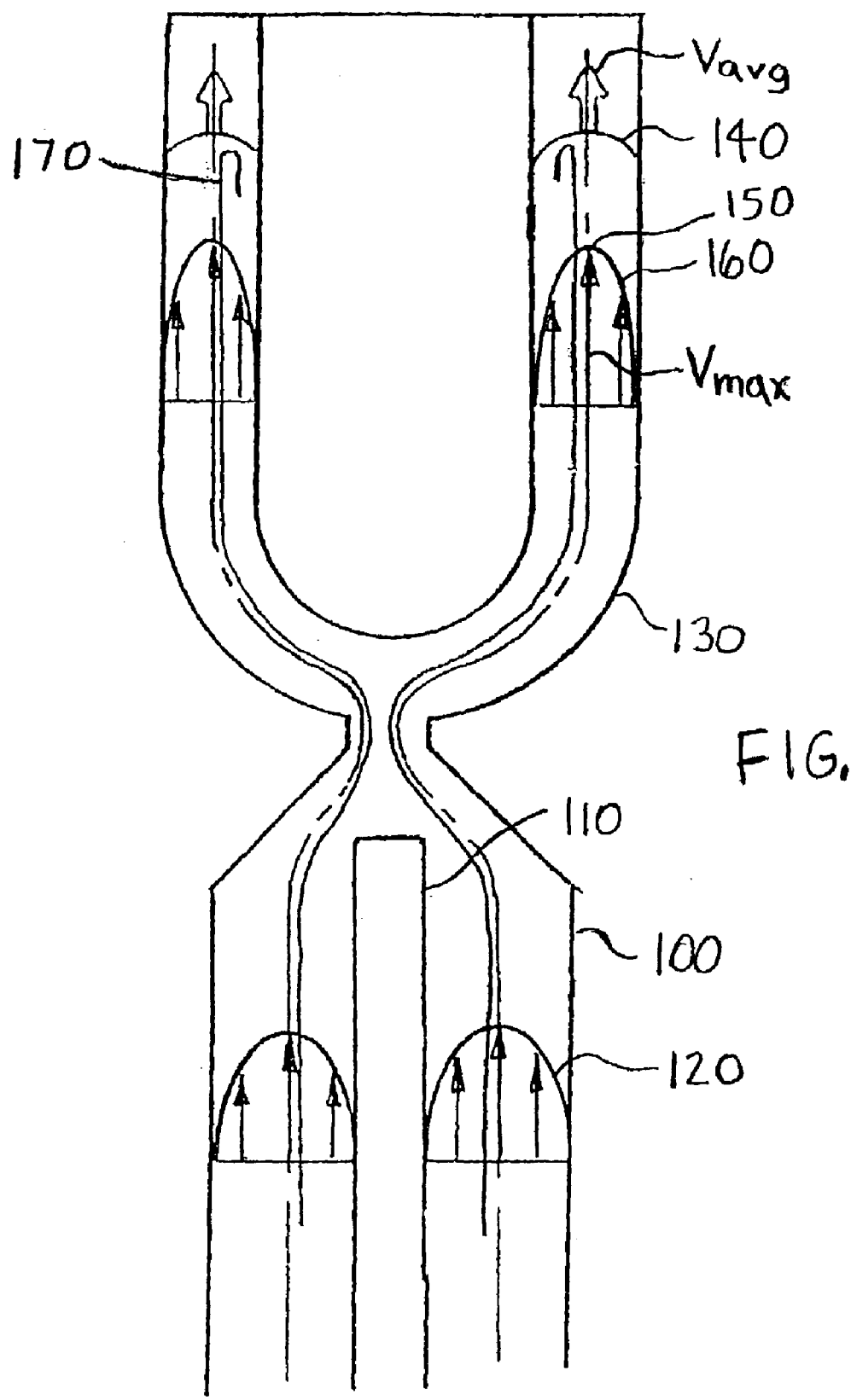
FIG. 1 is a cross sectional view of an injection molding system according to a first exemplary embodiment of the present invention.

U.S. patent application Ser. No. 09/828,254, filed Apr. 6, 2001 and U.S. Provisional Patent Application No. 60/353, 596, filed Jan. 31, 2002 are both incorporated by reference herein in their entireties, as though set forth fully herein.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

One exemplary embodiment provides a method and apparatus for extruding plastic articles to change the relative volumetric flow rate of the skin layers and the interior core layer, so that no part of the interior layer is on the zero-velocity gradient of the combined flow thereby preventing break though of the interior (core) layer through the flow front formed by the inner and outer skin layers.

By moving the interior layer away from the zero velocity gradient to a slower moving streamline that has a velocity that is greater that the average velocity, the interior layer can "catch up" to the fountain flow and wrap over, creating uniform coverage of the molded part.

The interior layer may be located either inside or outside the location of the zero-velocity gradient creating wrap over toward the inside or outside of the part, respectively.

Figure 3:
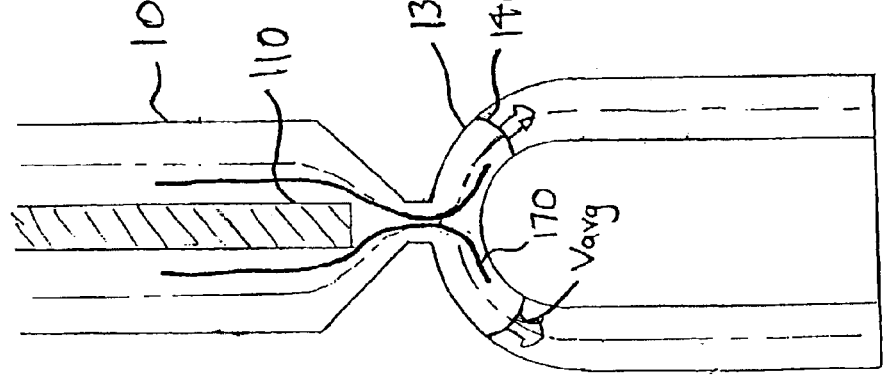
FIG. 3 shows the injection of material in an article before the interior flow catches up with the flow front.

FIG. 1 shows a cross section of an injection molding system according to a first exemplary embodiment of the present invention. FIG. 1 shows the velocity profile 120 at the end of the nozzle 100 having a throttle pin 110. FIG. 1 also shows the velocity profile 160 near the flow front 140 in an article 130, such as a container perform. The flow front moves at an average velocity $V_{avg}$. FIG. 3 shows an injection molding system where a interior layer is disposed to flow on an offset streamline through a nozzle and into the a mold cavity.

Core breakthrough may occur during the sequential injection of materials that are injected across the zero-velocity gradient. The zero velocity gradient occurs at the point where the velocity of the flow is greatest. Because the flow at the zero velocity gradient point is greater than the average velocity of the flow front, the interior material injected at the zero velocity gradient point can, under some circumstances, "catch up" to and pass the flow front and break through the skin, even if injection of the interior material begins after injection of the PET or PP inner and outer layers. The interior (core) material will breakthrough when the interior material reaches the flow front at the zero velocity gradient.

In one exemplary embodiment of the invention, the outer and inner PET or PP layers and the interior layer are injected in a way that causes the interior layer to fold over on itself, without breaking through the inner or outer layers, as shown in FIG. 1. FIG. 1 also shows the velocity profile 160 near the flow front 140 in article 130. Because the interior (core) material 170 is injected along a streamline having a velocity greater than the average flow velocity, but less than the velocity Vmax at the zero velocity gradient 150, the interior flow 170 wraps around near the flow front 140.

This method creates good part coverage, because the leading edge is uniform due to the fact that no portion of the interior layer is on the zero-velocity gradient.

To achieve wrap over, the interior (core) layer is placed so that no portion of the interior (core) layer is on the zero velocity gradient and so the interior (core) layer is on a streamline that has a velocity higher than the average flow velocity $V_{avg}$. If the interior layer is on a streamline having a velocity lower than the average flow velocity, the interior layer can never catch up to the flow front, and does not wrap around. So long as the interior layer is in between the streamline having the average velocity and the zero velocity gradient streamline, then the interior layer can catch up to the flow front, but will wrap around on itself, instead of breaking through the flow front.

Figure 2:
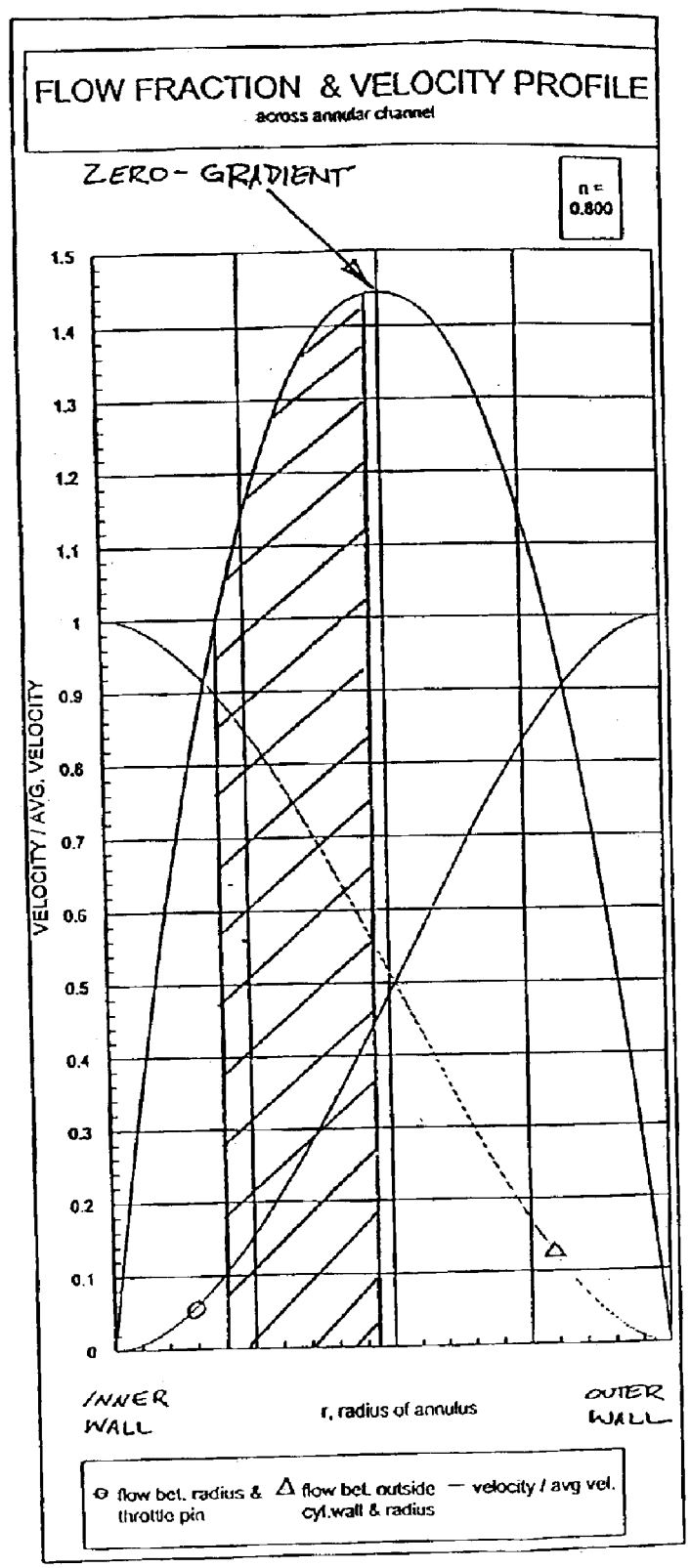
FIG. 2 shows a velocity profile for the injection molding system of FIG. 1.

FIG. 2 shows the normalized velocity profile and volume fraction inside and outside for a fluid with n=0.8 (where n is the parameter for the non-Newtonian power law model of fluid flow). The hatched area shows the acceptable location for interior layer placement that is both greater than the average velocity and off the zero velocity gradient. This area will wrap the layer to the inside of the part. From the graph we can see that the flow fraction of the inside layer can be in a range from 0.1 to 0.45. The flow fraction of the outside layer can be from 0.9 to 0.55. The interior layer thickness can be as thick as 0.45.

Although the distance between the interior layer and the zero velocity gradient streamline can be arbitrarily small, it is preferable to locate the core layer a sufficient distance from the zero velocity gradient so that the interior layer does not cross the zero velocity gradient streamline, even when the core location assumes its worst case tolerance location (i.e., the greatest anticipated error in location of the interior layer).

Figure 4:
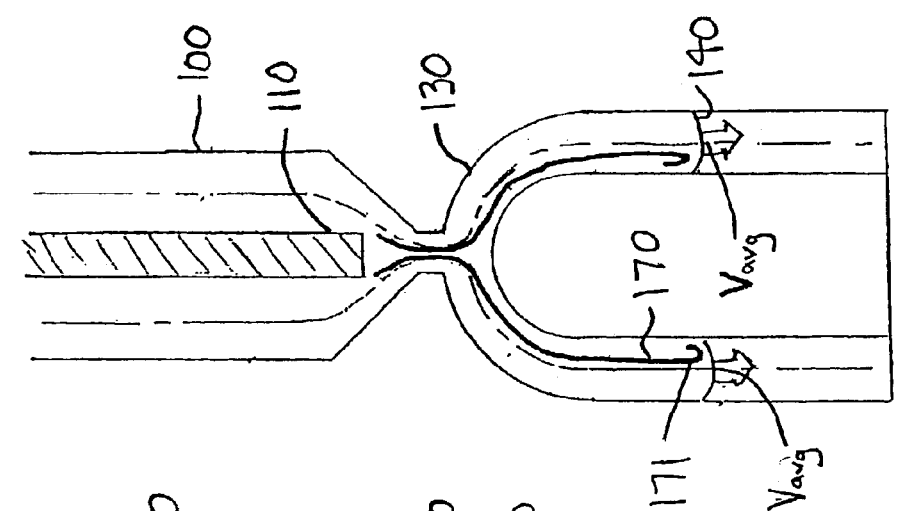
FIG. 4 shows the injection of material in the article of FIG. 3 shortly after the interior flow catches up with the flow front.
Figure 5:
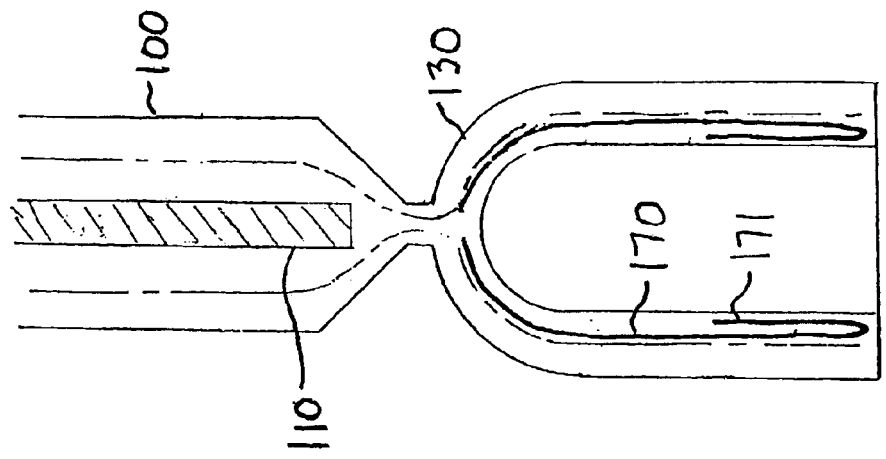
FIG. 5 shows the injection of material in the article of FIG. 4 some time after the interior flow catches up with the flow front.

FIGS. 3 to 5 show three different times during the injection of an article 130. In FIG. 3, the material forming the inner and outer layers has begun to flow, followed by the interior layer 170. At this point, the interior layer 170 has not yet caught up with the fountain flow region adjacent to the flow front 140. The interior layer proceeds along the streamline substantially parallel to the streamline that passes through the zero velocity gradient 150.

In FIG. 4, the interior layer 170 has just reached the fountain flow region adjacent to the flow front 140 and has begun to wrap around to form a "hook" shape 171. In this case, the interior layer is inside the zero velocity gradient line, so the interior layer 170 wraps around towards the inside of the article.

In FIG. 5, the flow front has moved further, resulting in extension of the "hook" section 171 of the interior flow.

The interior layer wrap method is distinct from other multi-material processes creating fold over because it us created by a interior stream of material following in a streamline that wraps when it reaches the fountain flow portion at the flow front. Additionally, because no portion of the interior layer that is wrapping is on the zero-velocity gradient the interior layer will theoretically never break through the skin. This method creates uniform part coverage because a non-uniform leading edge can wrap when it reaches the flow front staying close to the flow front without breaking through.

Because the interior layer is displaced from the maximum velocity streamline, the interior layer never catches up to and passes the flow front. Injection of the interior layer can begin at the same time as, or very shortly after, the skin layer material. Precise control over the time difference between starting the skin layers and starting the interior core layer is not required to prevent breakthrough. The interior layer injection should begin soon enough after the skin injection so that the interior layer catches up to the flow front. Once the interior layer catches up with the flow front and wraps around, the "hook" portion of the interior layer propagates forward and stays close to the flow front, so that the portion of the interior layer doubled upon itself elongates without breaking through the skin layers.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of co-extruding a plurality of plastic material flowing streams into a mold cavity to produce a molded product, comprising the steps of:

combining inner and outer streams of covering plastic materials with at least one interior stream that is to serve as an interior core of a resulting molded plastic product;

forcing the combined streams to flow along annular flow paths to form an annular interior stream and inner and outer annular streams of covering plastic materials, with the annular interior stream encased within the inner and outer annular streams of covering plastic materials;

controlling the flows of the annular interior stream and the inner and outer annular streams of covering plastic materials so that:

a portion of the annular interior stream has a flow velocity that is greater than an average velocity of the combined streams;

the portion of the annular interior stream reaches a region adjacent to a flow front of the combined streams; and the portion of the annular interior stream does not flow along or across a zero-velocity-gradient streamline of the combined streams.

2. The method of claim 1, wherein the controlling step is performed by controlling relative volumetric flow rates of the inner, outer and interior streams.

3. A method of co-extruding a plurality of plastic material flowing streams into a mold cavity to produce a molded product, comprising the steps of:

combining inner and outer streams of covering plastic materials with at least one interior stream that is to serve as an interior core of a resulting molded plastic product;

forcing the combined streams to flow along annular flow paths to form an annular interior stream and inner and outer annular streams of covering plastic materials, with the annular interior stream encased within the inner and outer annular streams of covering plastic materials;

controlling the flows of the annular interior stream and the inner and outer annular streams of covering plastic materials so that:

the annular interior stream has a flow velocity that is greater than an average velocity of the combined streams, the interior stream does not flow along or across a zero-velocity-gradient streamline of the combined streams, and the annular interior stream wraps over on itself without breaking through the annular inner stream or the annular outer stream.

4. The method of claim 3, wherein a wrapped leading edge of the annular interior stream propagates forward with a flow front of the combined flows.

5. The method of claim 4, wherein the wrapped leading edge of the annular interior stream stays close to the flow front of the combined flows.

6. A method according to claim 1, wherein:

the inner stream constitutes between 10% and 45% of a combined volumetric flow of the combined streams;

the interior stream constitutes between an amount greater than 0% and 10% of the combined volumetric flow; and the outer stream constitutes between 55% and 95% of the combined volumetric flow.

7. The method of claim 1, wherein none of the interior stream or annular interior stream flows along or across a zero-velocity-gradient streamline of the combined streams.

8. The method of claim 3, wherein none of the interior stream or annular interior stream flows along or across a zero-velocity-gradient streamline of the combined streams.

9. The method of claim 1, wherein the region adjacent to the flow front of the combined streams is a fountain flow region.

10. The method of claim 1, wherein the annular interior stream wraps over on itself without breaking through the annular inner stream or the annular outer stream.

11. The method of claim 10, wherein a wrapped leading edge of the annular interior stream propagates forward with a flow front of the combined flows.

12. The method of claim 11, wherein the wrapped leading edge of the annular interior stream stays close to the flow front of the combined flows.

* * * * *